M. J. BURKEL AND P. B. WEIS.
ENGINE FOR DRILLING MACHINES.
APPLICATION FILED MAY 17, 1916.

1,369,082.

Patented Feb. 22, 1921.
5 SHEETS—SHEET 2.

Inventors
Mathew J. Burkel
Paul B. Weis
by Bronson & Phillips Attys

M. J. BURKEL AND P. B. WEIS.
ENGINE FOR DRILLING MACHINES.
APPLICATION FILED MAY 17, 1916.

1,369,082.

Patented Feb. 22, 1921.

Witnesses:

Inventors
Mathew J. Burkel
Paul B. Weis

M. J. BURKEL AND P. B. WEIS.
ENGINE FOR DRILLING MACHINES.
APPLICATION FILED MAY 17, 1916.

1,369,082.

Patented Feb. 22, 1921.
5 SHEETS—SHEET 4.

UNITED STATES PATENT OFFICE.

MATHEW J. BURKEL AND PAUL B. WEIS, OF AURORA, ILLINOIS, ASSIGNORS TO CLARENCE E. MEHLHOPE, TRUSTEE, OF WINNETKA, ILLINOIS.

ENGINE FOR DRILLING-MACHINES.

1,369,082.

Specification of Letters Patent. Patented Feb. 22, 1921.

Application filed May 17, 1916. Serial No. 98,017.

*To all whom it may concern:*

Be it known that we, MATHEW J. BURKEL and PAUL B. WEIS, citizens of the United States, and residents of Aurora, in the county of Kane and State of Illinois, have invented certain new and useful Improvements in Engines for Drilling - Machines; and we do hereby declare that the following is a full, clear, and exact description thereof, reference being had to the accompanying drawings, and to the letters of reference marked thereon, which form a part of this specification.

This invention relates to improvements in pneumatic tools and consists of the matters hereinafter described and more particularly pointed out in the appended claims.

Our improved pneumatic tool is embodied in a form known to the trade as a close-quarter drilling machine, but it is capable of almost universal use as a drilling machine, by reason of its novel construction and operation, as will clearly appear as we proceed with our specification.

The improved drilling machine is actuated by means of a duplex, reciprocating, pneumatic motor, the two pistons of which are operatively connected to drive a crank shaft, which through intermediate gearing is made to drive the tool spindle in either direction. The motor is reversible and is connected to the crank shaft so that the latter may be started in either direction. The drilling machine is thus completely reversible and is capable of use where prior close quarter drills may not be used by reason of the fact that they are not reversible.

The many objects and advantages of our improved drilling machine may be more clearly pointed out after we have described its construction in detail and for this reason a description of them will be deferred until later.

Referring now to the drawings.

Figures 1, 2, 3:
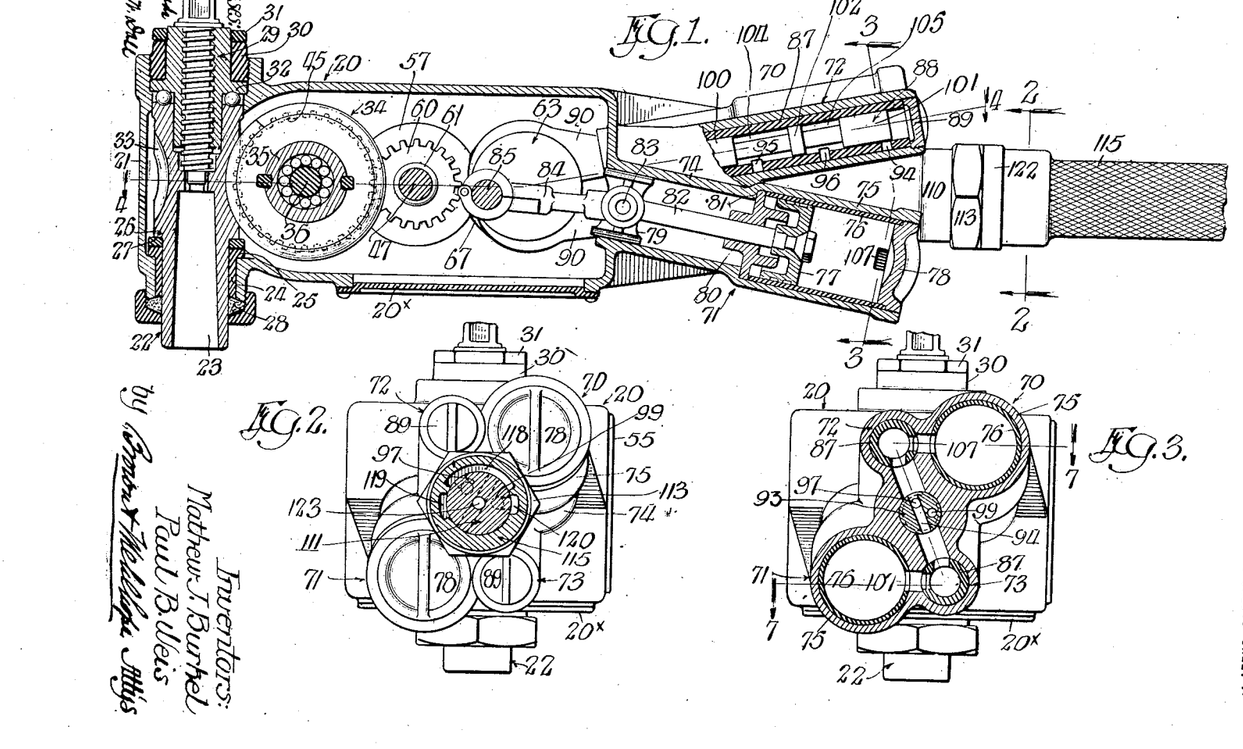
Figure 1 is a view representing a longitudinal section through our improved drilling machine in a plane indicated by the line 1—1 of Fig. 4.
Fig. 2 is a view representing a transverse sectional end elevation of the same in a plane indicated by the line 2—2 of Fig. 1.
Fig. 3 is a view representing a transverse section through the drilling machine in a plane indicated by the angular line 3—3 in Fig. 1.
Figure 4:
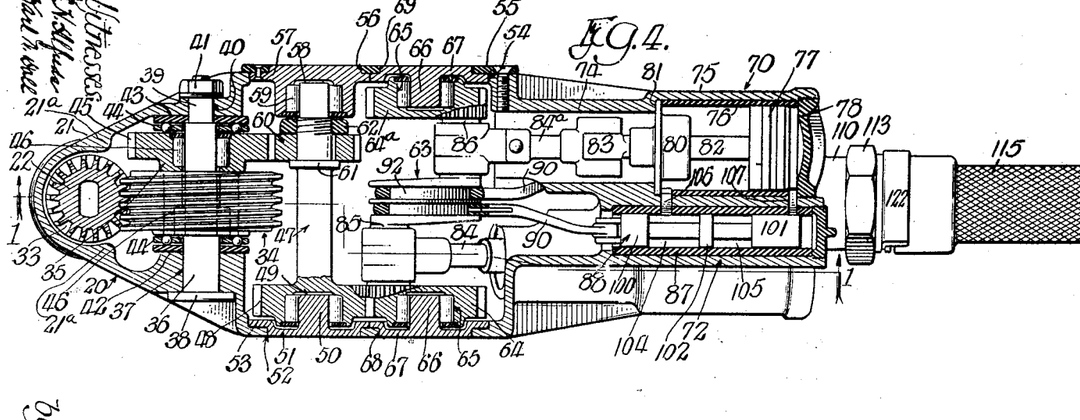
Fig. 4 is a view representing a longitudinal section through the drilling machine in a plane at right angles to the section shown in Fig. 1, as indicated by the angular line 4—4 of Fig. 1.

Referring now to that embodiment of our invention illustrated in the drawings, 20 indicates a hollow shell or casing which constitutes the body of the drilling machine. This shell is substantially rectangular in cross section as indicated in Figs. 2 and 3, but is tapered on two sides toward the spindle end 21 as indicated in Fig. 4. 22 indicates a spindle which has bearing in the end of the casing, and has the familiar socket 23 to receive the shank of the drill. The spindle is mounted close to the end wall 21 of the casing which is made concentric with the rotary axis of the spindle.

A sleeve 24 fixed in a suitable socket in the bottom wall of the casing provides rotative bearing for the lower length of the spindle and a radial flange 25 at the top of said sleeve provides a thrust bearing for a radial shoulder 26 on the spindle—a washer 27 being interposed between the two. A stuffing box 28 is provided to close the bearing opening in the shell about the bottom end of the spindle. The upper end of the spindle has rotative bearing in a socket formed in the top of the shell and has thrust bearing against a head, or plug, 29. Said plug is retained in the shell by means of a ring 30, which is threaded into the top of said socket and surrounds the upper end of the plug.

A jam nut 31 is threaded upon the upper end of the plug to lock the ring 30 in place. As shown, the top of the spindle is provided with a bearing aperture or recess into which the bottom end of the plug 29 extends, thus providing a bearing for the top of the spindle. A radial shoulder 32 on the plug provides an end thrust for the top end of the spindle, anti-friction balls being interposed between the two.

The intermediate length of the spindle 22 is provided with longitudinal teeth 33. Said teeth are engaged by a worm 34 mounted near the end of the casing with its axis at right angles to the axis of the spindle and to the axis of the casing. The said worm is of considerably greater diameter than the gear provided by the teeth 33 on the spindle and the threads of the worm approximate a right angle to the rotative axis of the worm. By this construction a maximum of torque is imparted to the spindle to drive the tool. As will be manifest the worm and gear may be of multiple or of single thread as required. As shown in the drawings the thread is single. The gear teeth 33 on the spindle are cut inwardly in an arc of the radius of the worm so that the worm may engage a maximum number of said teeth.

The side walls of the casing are strengthened in the vicinity of the spindle by means of vertically extending, internal ribs 21ª, 21ª, which merge or disappear transversely into the curved end wall 21. This construction obviates the necessity for the usual external strengthening rib and, as but little clearance is required between the spindle and the end wall of the casing, it is possible to more closely approach the axis of the spindle to fixed parts in the neighborhood of the hole that is to be drilled.

The worm 34 is mounted on a sleeve 35 to which it is keyed and the sleeve in turn is rotatively mounted on a shaft 36 that extends transversely through the casing 20. Said casing is provided with suitable openings 37, 40, in its side walls to receive the shaft, which, in assembling the drilling machine, is inserted through the opening 37 at one side, its movement therethrough being limited by means of a head 38. The other end of the shaft, namely the end 39, is reduced and extends through the opening 40, beyond which it is engaged and locked in place by means of a nut and washer 41. The inside wall of the casing is formed to provide thrust shoulders 42—43 about the shaft 36 and between these and the ends of the sleeve 35 are interposed suitable anti-friction bearing devices 44—44. At one end of the sleeve 35 is formed an integral spur gear 45. Roller bearings 46—46 are provided at the ends of the sleeve between said sleeve and the shaft 36.

A second transverse shaft 47 is mounted in the casing near the first named shaft 36 and in parallel relation thereto. Said shaft has a spur gear 48 made integral with it at one end and is provided with a recess 49 at that end, which bears upon a stud 50, extending inwardly from the side wall of the casing. The stud 50 is formed on a disk 51, which is fixed in a suitably formed hole, or opening, 52, in the casing wall. Said disk has a flange 53 which is spaced inwardly from its outer face and which engages against the inside wall of the casing about said hole, the outer face of the disk being flush with the outside surface of the side wall of the casing.

On the opposite side of the casing is a large hand opening 54 which is closed by a plate 55 screwed to the casing. Said plate is provided with an opening 56 similar to the opening 53 in the opposite side wall of the casing and in said opening is engaged a flanged disk 57, which is like the disk 51 except that it has a recessed boss 58, extending into the casing to provide a bearing for the end of the shaft 47. Suitable roller bearings 59—59 are provided between the shaft and the bearing stud 50 on the one hand and the recessed bearing boss 58 on the other hand.

A spur gear 60 is fixed on the shaft 47 between an integral radial shoulder 61 and a nut 62 threaded upon the shaft near its end,—the bearing end of the shaft being reduced in diameter to permit said nut to be slipped beyond it. Said spur gear engages the spur gear 45 which, as has been described, is non-rotatively connected to the worm 34.

Near the shaft 47 and arranged parallel thereto and in plane of the shafts 37 and 47, there is mounted a crank shaft 63. The bearing ends of said shaft are formed to provide spur gears 64 64ª which are made coaxial with the rotative axis of the crank shaft. Said gears have bearing recesses 65 on their outer faces, which are engaged by studs 66, 66, fixed in the side walls of the casing. The studs 66, 66, are made integral with flanged disks 67, 67, one of which is engaged in an aperture 68 in the side wall of the casing and the other of which is engaged in an aperture 69 in the plate 57 that closes the hand hole on the opposite side of the casing. Said disks are similar in construction and in manner of engagement within their respective openings to the disk 51 already described.

The gear 64 on the crank shaft 63 adjacent the side of the casing opposite the hand hole engages the gear 48 on the shaft 47. The second gear $64^a$ on said crank shaft is normally an idle gear; but in case the active gear 64 is broken it is only necessary to reverse the crank shaft and bring the second gear $64^a$ into the place occupied by the first one.

From the construction thus far described it will be apparent that the rotation of the crank shaft, through the gears 64—48, imparts rotative movement to the shaft 47, which in turn through the gears 60 and 45 imparts rotative movement to the worm so as to drive the spindle.

The bottom wall of the casing has a hand hole which is closed by a plate $20^x$. (See Figs. 1, 2 and 3). This hole provides for the inspection of the gearing in the casing, after it has been assembled, and also for packing the casing with grease.

The crank shaft is driven by means of a two cylinder reciprocating pneumatic motor or engine which is mounted in the rear end of the casing 20. The cylinders of the engine are made integral with the casing and are arranged in planes extending at an acute angle to each other and intersecting in the rotative axis of the crank shaft as shown in Fig. 1. 70—71 indicate the cylinders and 72—73 their associated valve chests. As the construction of the two are similar, a description of one will suffice, the like parts of the two cylinders and of their valve mechanisms being indicated by like numerals.

The body of the cylinder 71 is provided by a tubular shell 74 made as stated, integral with the casing 20. The outer end 75 of said shell is of larger diameter than its inner end and contains a sleeve 76 in which the piston 77 has reciprocatory bearing. Said sleeve is held in place by means of a threaded plug 78, that is screwed into the outer end of the shell 75 and forms the head of the cylinder. 79 indicates a cross head which has reciprocatory bearing in the smaller part of the shell. An apertured plug 80 closes the inner end of the cylinder proper, the same being engaged between the inner end of the sleeve 76 and the annular shoulder 81 formed in the shell where the two parts of different diameter meet.

82 indicates the piston rod which has a pivotal connection 83 with the cross head 79 and which reciprocates through the aperture in the plug 80 in the usual manner. 84 indicates a connecting rod and 85, a crank pin on the crank shaft, which is connected by said rod to the cross head 79. 86 indicates the other crank pin of the crank shaft, which is connected by a like connecting rod $84^a$ to the piston rod of the other cylinder. The two crank pins 85—86 are separated from each other by an angle of 180°.

Referring now to the valve chest 73 associated with the cylinder 71, the body of this valve chest is formed by a tubular shell made integral with the casing as in the case of the cylinder, said body containing a bushing 87 in which a piston valve plug 88 is longitudinally reciprocable. The outer end of the valve chest is closed by means of a threaded cap 89. A link 90 connects the valve plug to an eccentric 92 fixed to the crank shaft in a position intermediate the two crank pins 85 and 86. The axes of the eccentrics are diametrically opposite each other and are arranged in a plane extending at a right angle to the plane of the axes of the crank pins, as clearly shown in Figs. 7 to 10 inclusive.

Figure 5:
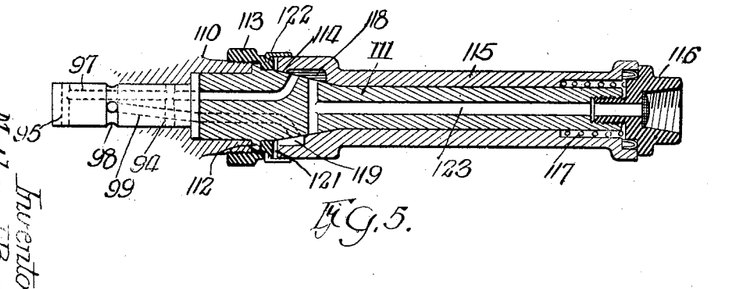
Fig. 5 is a view representing a longitudinal section through the throttle valve which controls the inlet of fluid to the motor of the drilling device.
Figure 6:
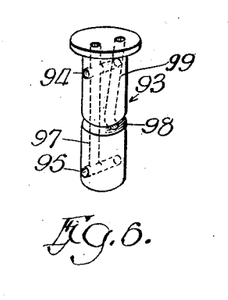
Fig. 6 is a perspective view of a valve plug associated with the valve chests of the motor cylinders.

In the plane of and between the two valve chests 72—73 there is fixed in the casing 20 a ported plug 93. (See Figs. 3, 7 and 8). 94, 95 indicate ports extending transversely through said valve plug and opening respectively into the outer and inner ends of each valve chamber. Said ports communicate with a longitudinal passage 97 in the plug 93. 96 indicates a port opening into each valve chamber half way between the ports 94 and 95. Said ports are connected by an annular groove 98 in the plug 93 (see Figs. 5 and 7) with a longitudinal passage 99 in said plug. When the drilling machine is running in one direction the passage 97 and the ports 94 and 95 constitute an inlet passage and inlet ports while the ports 96 and the passage 99 constitute exhaust ports and an exhaust passage. When the machine is reversed, the functions of these ports and passages are reversed.

The valve plug 88 has parts 100, 101, of full diameter at its ends and also a like part 102 about midway of its length. Between said parts the plug is of reduced diameter to provide annular spaces 104, 105. 106, 107 indicate ports connecting the ends of the cylinder with the valve chamber. In the reciprocation of the valve plug the said ports are made by the annular spaces 104, 105 to connect the cylinder on one side of the piston with one or the other of the inlet ports and at the same time to connect the cylinder on the other side of the piston with the exhaust port, so as to produce a reciprocation of the piston in a familiar manner, as may be readily seen by an examination of Figs. 7 and 8.

At the end of the casing in axial alinement with the plug 93 is provided a tubular, externally threaded boss 110 which receives the inner end of a throttle valve plug 111. Said plug has a radial shoulder 112 near its end which abuts against the end of the boss 110 and which is held engaged therewith by a union nut 113 screwed upon the end of said boss. Beyond the shoulder 112 the plug is tapered, as indicated at 114, toward the main body of the plug 111, which is reduced in diameter. The before mentioned inlet and exhaust passages 97 and 99 are extended through the inner end of the valve plug and open through the tapered part 114 thereof. 123 indicates a longitudinal passageway extending from the front end of the plug and opening at its rear end through the tapered part of the plug at a point forward of the open ends of the passages 97, 99.

115 indicates a bushing or sleeve mounted on the throttle valve plug 111, said bushing constituting the movable part of the throttle valve. Said bushing is formed at its inner end to seat upon the tapered part 114 of the plug and is retained in place by means of a nipple 116 threaded into the end of the plug in a familiar manner. The bushing is chambered at its end to receive a coiled spring 117 which acts between a fixed part of the sleeve and the nipple 116, to hold the bushing in snug seating engagement with the tapered part of the plug.

In the bushing 115 there is formed about the tapered part of the plug a bridging port 118 which is adapted to be brought into position to communicate either with the passage 97 or with the passage 99, and to connect either the one or the other of these passages with the main inlet passage 123, depending upon which one of these passages is acting as an inlet passage—that is to say whether the motor is running in one direction or in the reverse direction.

The bushing 115 terminates short of the union nut 113 to leave an exhaust space 121. 119—120 indicate ports in the end of the bushing 115 (see Figs. 2 and 5) which open into the space 121. The port 119 may be brought into communication with the passage 99 or the port 120 may be brought into communication with the passage 97. Thus these ports provide means for connecting either the passage 97 or the passage 99 with the exhaust space 121. An air exhaust, deflecting ring 122 of familiar construction is connected in the usual manner to the union nut so as to inclose the space 121.

Thus as will be manifest, by a part turn of the bushing 115 on the throttle valve plug 111, the inlet passage may be brought by means of the bridging port 118 into connection either with the passage 97 or with passage 99, the passage not thus connected being at the same time connected by one or the other of the ports 119, 120 with the exhaust space 121. The inlet and exhaust passages to the motor by this means may be changed so as to reverse the engine. Suitable stops (not shown) are provided for limiting the rotative movement of the valve bushing 115 and to stop it in either of the positions described.

Referring now to the operation of the motor:

In Figs. 12 to 15 inclusive, the relative positions of the two pistons and of their associated crank pins are shown diagrammatically in four successive positions of the crank shaft, illustrating a complete rotation thereof through 360°. The arrows in said figures indicate the direction of rotation of the crank shaft. From these illustrations it will be apparent, that, on account of the angular relation of the two cylinders (70, 71), the pistons will never be on dead center at the same time, notwithstanding the fact that the two crank pins are separated by an angle of 180°.

Figure 12:
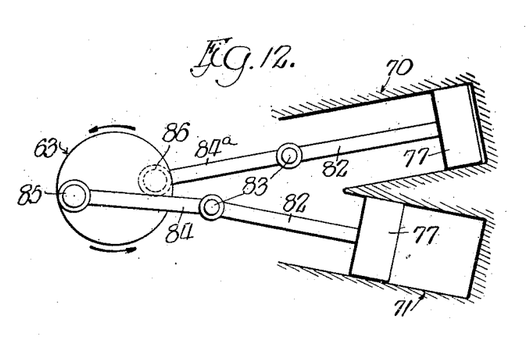
Figs. 12, 13, 14 and 15 are diagrammatic sectional views indicating the relative positions of the pistons of the motor and of their respective crank pins in various positions of one complete cycle.
Figure 13:
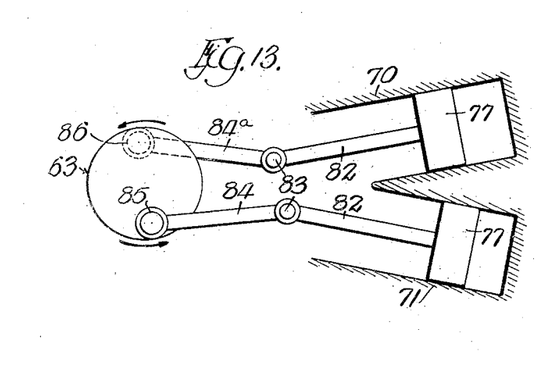
Figure 14:
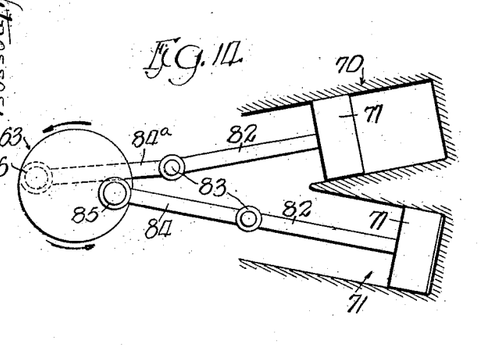
Figure 15:
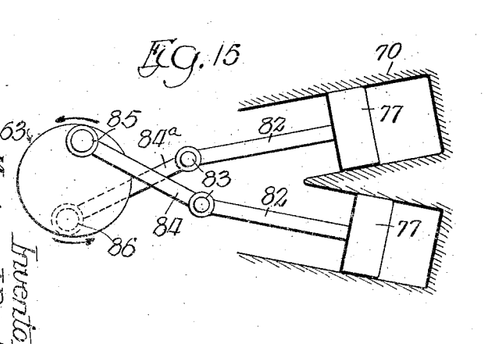

Thus in Fig. 12, the crank pin 86 and the piston of the cylinder 70 are at dead center, while the crank pin 85 and the piston of the cylinder 71 have just reached and passed somewhat beyond dead center. In Fig. 14 with each of the pistons at or near the other ends of its stroke, the crank pin 86 and the piston in the cylinder 70 are approaching dead center, whereas the crank pin 85 and its piston in the cylinder 71 are at dead center. Thus no matter in what position of the crank shaft the motor stops, admission of the pneumatic fluid by the throttle valve to drive the pistons in either direction, will be effective to operate the motor.

Figures 7, 8, 11:
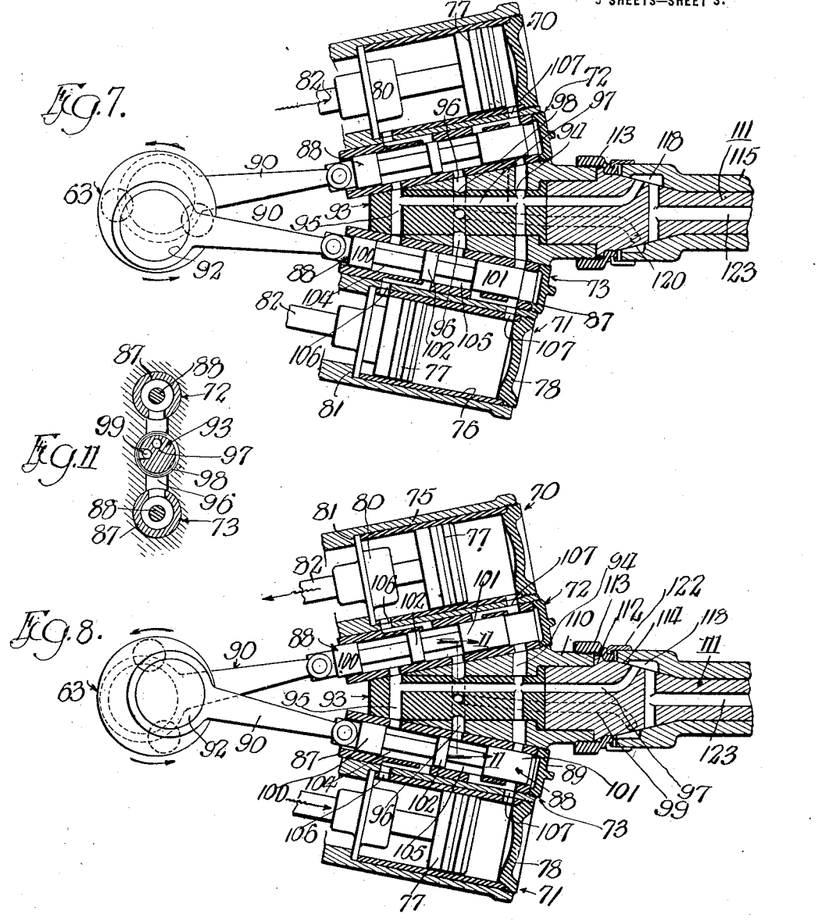
Figs. 7, 8, 9 and 10 are views representing longitudinal sections through the cylinders and the valve chests in an angular plane indicated by the line 7—7 of Fig. 3, showing the relative positions of the pistons and of their associated valves, as will appear more clearly in the detailed description following.
Fig. 11 is a view representing a transverse section through the valve chests in a plane indicated by the line 11—11 of Fig. 8.

In Figs. 7 and 8, the pistons of the two cylinders and the valve plugs of their associated valve chests are shown in two different positions. The throttle valve bushing 115 is shown in said figures adjusted to connect (by means of the bridging port 118) the main inlet passage 123 in the throttle valve with the passage 97 in the intermediary plug 93. The passage 97 is thus in this case the inlet passage for the motor, while the passage 99 is the exhaust passage. The arrows indicate the direction in which the pistons and valves are moving.

In Fig. 7 the piston in the cylinder 70 is approaching the outer end of its stroke and the valve plug in the associated valve chest is in a position still connecting the cylinder port 106 on the inner side of the piston with the inlet port 95, and the cylinder port 107 on the outer side of the piston with the exhaust port 96. The piston in the cylinder 71 on the other hand has reached the end of its stroke and the valve plug in the associated valve chest has closed both of the cylinder ports (106, 107).

In Fig. 8 the piston in the cylinder 70 is moving toward the inner end of its stroke and the valve plug in the associated valve chest is in a position connecting the cylinder port 107 at the outer end of the cylinder with the inlet port 94, and the cylinder port 106 at the inner end of the cylinder with the exhaust port 96. The piston in the cylinder 71, is moving toward the outer end of its stroke and the valve plug in the associated valve chest is in a position to connect the cylinder port 106 at the inner end of the cylinder with the inlet port 95, and the cylinder port 107 at the outer end of the cylinder, with the exhaust port 96.

Figure 9:
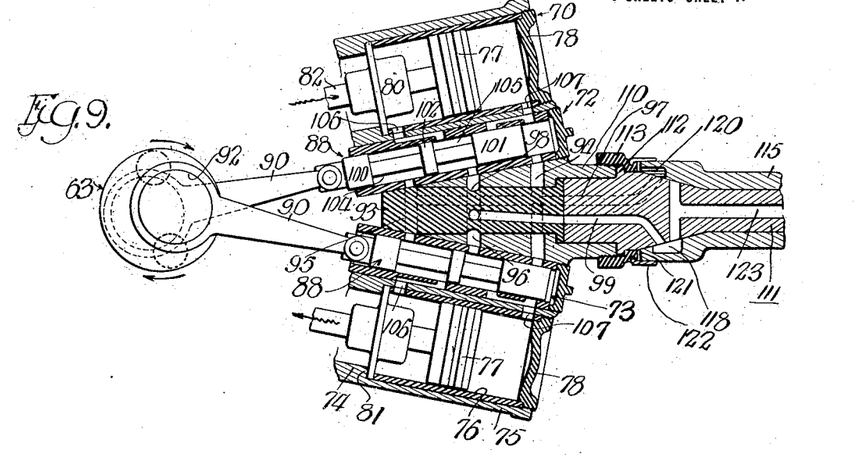
Figure 10:
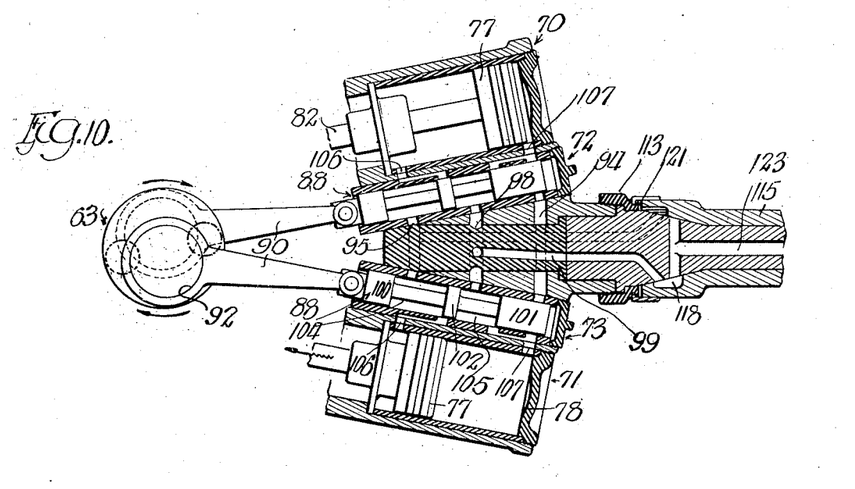

In Figs. 9 and 10, the throttle valve bushing is shown adjusted to connect (by means of the bridging port 118) the main inlet passage 123 of the throttle valve to the passage 99, which in Figs. 7 and 8 was the exhaust passage, but upon the reversal of the motor, now constitutes the inlet passage. The passage 97 (formerly the inlet passage) is now the exhaust passage. With the exception of the reversal of the function of these two passages—97, 99—the operation and connections are the same upon reversal of the motor as that heretofore described and will be apparent from an examination of Figs. 9 and 10, without further description.

The many advantages of the improved drilling machine will be manifest from the foregoing description, to those familiar with the art.

As has been pointed out, the use of the worm of large diameter in connection with the gear on the spindle of comparatively smaller diameter, together with the arrangement of the teeth of the worm and of the gear so that the former extend nearly at right angles to the axis of the worm, provides for a very powerful drive and raises the efficiency of the drilling machine to a maximum. By the use of the worm drive also, the spindle may be effectively operated in either direction and this, in combination with the reversible motor operating as described, makes it possible for the drilling machine to be used not only as a close quarter drill but for tapping, reaming and all operations of the kind where a reverse drive of the spindle is required. Thus, the improved drilling machine may be used as a universal tool.

Another and primary advantage of the improved drilling machine results from the fact that the several gears in the casing may be easily and readily changed to suit different requirements without change of the casing or body of the tool. Thus, where as now in the manufacture of pneumatic tools, it is necessary to have a great many different patterns, jigs, dies and special tools to manufacture the many different drills necessary to satisfy the many uses to which such drills are put, in the case of the present drilling machine it will be required to have only equipment to make a comparatively limited number of casings or bodies to suit several different varieties of tapers of the tool shank and the various speeds required in the many different uses of the tools may be readily accommodated by simple changes of the gearing in one or the other of the said limited number of bodies or casings.

Thus, in the case of the drill body illustrated, to further increase the speed of the tool spindle, it would simply be necessary to substitute a worm with a multiple thread instead of the single thread shown therein and change the spindle to one having teeth to be engaged by said worm. Again, the speed of the spindle for the same body may be varied by changes in the gears 45 and 60. Thus the varied requirements that might be met in a single body will be apparent to those familiar with the art. The enormous saving in the expense of equipment required to manufacture a full line of drills to meet all situations in the case of the improved drilling machine will therefore be readily understood.

By reason of the fact that the worm teeth are substantially at right angles to the axis of the worm it will be manifest that the drill may be used as a wrench or extractor for removing the tool from the hole cut after the tool has been driven as far as desired.

It will be noted that the body or casing and the plates and parts connected thereto are all made in such manner that a smooth body is presented for the grip of the workman. Thus, shoulders and sharp edges which are so objectionable in tools of this type, as at present constructed, are entirely eliminated.

While in describing our invention, we have referred to various details of construction and arrangement, it is to be understood that the invention is to be in no way limited thereto, except as may be pointed out in the appended claims.

We claim as our invention:

1. In a drilling machine in combination with a casing, a spindle mounted in one end of said casing, a crank shaft rotatively mounted in said casing and extending at right angles to said spindle, gearing intermediate said crank shaft and said spindle for driving the spindle in either direction, a two-cylinder motor unit, each cylinder having a piston reciprocating therein and connected to said crank shaft, the two cylinders being located in two different planes which intersect at an acute angle in the transverse median plane of said casing, and said crank shaft having two diametrically-opposite crank pins each operatively connected to one of said pistons.

2. In a drilling machine in combination with a casing, a spindle mounted in one end of said casing, a crank shaft rotatively mounted in said casing and extending at right angles to said spindle, gearing intermediate said crank shaft and said spindle for driving the spindle in either direction, a two-cylinder motor unit, each cylinder having a piston reciprocating therein and connected to said crank shaft, the two cylinders being located in two different planes which intersect at an acute angle in the transverse median plane of said casing, said crank shaft having two diametrically opposite crank pins, each operatively connected to one of said pistons, and means for admitting a pneumatic fluid to said cylinders including a reverse valve whereby the crank shaft may be driven in either direction.

3. In a drilling machine in combination with a casing, a spindle mounted in one end of said casing, a crank shaft rotatively mounted in said casing and extending at right angles to said spindle, gearing intermediate said crank shaft and said spindle for driving the spindle in either direction, a two-cylinder motor unit, each cylinder having a piston reciprocating therein and connected to said crank shaft, the two cylinders being located in two different planes which intersect at an acute angle in the transverse median plane of said casing, said crank shaft having two diametrically opposite crank pins each operatively connected to an associated piston, valve chests and valves associated with said cylinders, an intermediary valve plug provided with an inlet and exhaust passage adapted to be connected by said valves with said cylinders, and a throttle valve connected to said intermediary plug and provided with an inlet port and an exhaust port, said throttle valve having a movable member adapted to connect either of the passages in said intermediary plug in alternation with the inlet port and exhaust port respectively.

4. A drilling machine comprising an elongated casing having a pair of cylinder bores in one end which are located in different planes and which extend at an acute angle to each other to intersect in a transverse line between the ends of said casing, said casing end also having a pair of valve chest bores extending parallel to said cylinder bores, one for each cylinder bore, said associated cylinder bore and valve chest bore having communicating passageways, there also being passageways which connect said valve chest bores together, pistons and piston valves in said cylinder bores and valve chest bores respectively, a crank shaft journaled in said casing with its axis parallel to said transverse line, and operatively connected to said pistons and piston valves, a spindle journaled in the other end of the casing and operatively driven from said crank shaft, a valve plug located in the passageway connecting said valve chest bores, said valve plug having an inlet passageway and an exhaust passageway which communicate with the passageways connecting said valve chest bores, and a valve sleeve associated with the said valve plug for controlling the admission of an operating fluid into and out of said passageways in said valve plug.

5. A drilling machine comprising an elongated casing having a pair of cylinder bores in one end which are located in different planes and which extend at acute angles to each other to intersect in a transverse line between the end of said casing, said casing end also having a pair of valve chest bores which extend parallel to said cylinder bores, one for each cylinder bore, said associated cylinder bore and valve chest bore having communicating passageways, there also being passageways which connect said valve chest bores together, pistons and piston valves in said cylinder bores and valve chest bores respectively, a crank shaft journaled in said casing with its axis parallel to said transverse line, and operatively connected to said pistons and piston valves, a spindle journaled in the other end of the casing and operatively driven from said crank shaft, a valve plug located in the passageways connecting said valve chest bores, said valve plug having an inlet and an exhaust passageway connecting said valve chest bores, and a valve sleeve having inlet and exhaust ports adapted to be brought into register with the passageways in said valve plug, said valve sleeve being capable of rotation to reverse the proximate register of its ports with the ports in said valve plug.

6. In a drilling machine in combination with a casing, a spindle mounted in one end of the casing, an engine comprising a pair of cylinders in the other end of said casing, said cylinders being located in two different planes which intersect at an acute angle in a line at right angles to the axes of the spindle, a valve chest parallel with and associated with each cylinder, a piston in each cylinder and a valve reciprocable in each valve chest, a crank shaft mounted in the casing with its axis parallel to the line in which the planes of the cylinders intersect, said crank shaft having oppositely disposed crank pins and oppositely disposed eccentrics, the diameters of which are arranged at right angles to the diameter of said crank pins, each crank pin being operatively connected to and associated with one of said pistons and each eccentric being operatively connected to and associated with one of said reciprocable valves in said valve chest bores, and gearing operatively connecting said crank shaft and said spindle for driving the spindle in either direction.

7. In a drilling machine, in combination with a casing, a spindle mounted in one end of the casing, an engine comprising a pair of cylinders in the other end of said casing, said cylinders being located in two different planes which intersect at an acute angle in a line at right angles to the axis of said spindle, a valve chest parallel with and associated with each cylinder, a piston in each cylinder and a valve reciprocable in each valve chest, a crank shaft mounted in the casing with its axis parallel to the line in which the planes of the cylinders intersect, said crank shaft having oppositely disposed crank pins and oppositely disposed eccentrics, the diameters of which are arranged at right angles to the diameter of said crank pins, each crank pin being operatively connected to and associated with one of said pistons, and each eccentric being operatively connected to and associated with one of said reciprocable valves in said valve chest bores, gearing operatively connecting the crank shaft and said spindle for driving the spindle in either direction, and means for admitting a pneumatic fluid to said cylinders including a reverse valve, whereby said crank shaft may be driven in either direction.

8. In a drilling machine in combination with a casing, a spindle mounted in one end of the casing, an engine comprising a pair of cylinders in the other end of said casing, said cylinders being located in two different planes which intersect at an acute angle in a line at right angles to the axes of said spindle, a valve chest parallel with and associated with each cylinder, a piston in each cylinder and a valve reciprocable in each valve chest, a crank shaft mounted in the casing with its axis parallel to the line in which the planes of the cylinders intersect, said crank shaft having oppositely disposed crank pins and oppositely disposed eccentrics, the diameters of which are arranged at right angles to the diameter of said crank pins, each crank pin being operatively connected to and associated with one of said pistons, and each eccentric being operatively connected to and associated with one of said reciprocable valves in said valve chest bores, an intermediary valve plug having an inlet passage and an exhaust passage, each of which are adapted to be connected by said reciprocable valve with said cylinders, and a throttle valve having an inlet and an exhaust port adapted to connect either of the passages in the intermediary valve plug in alternation with said inlet and exhaust port respectively.

9. A drilling machine comprising an elongated casing having a pair of cylinder bores in one end of said casing, said cylinder bores being located in different planes which converge toward the other end of the casing and intersect in the transverse median plane of said casing, said casing end also having a valve chest bore parallel with and associated with each cylinder bore, said associated cylinder bores and valve chest bores having connecting passageways, there being passageways which connect the valve chest bores together, pistons and piston valves in said cylinder and valve chest bores respectively, a crank shaft journaled in the casing, said crank shaft having oppositely disposed crank pins and oppositely disposed eccentrics, the diameters of which are arranged at right angles to the diameters of said crank pins, means operatively connecting the piston with the crank pins, means operatively connecting the piston valves with the eccentrics, a spindle journaled in the other end of the casing, and operatively driven from the crank shaft, and a valve plug located in the passageway connecting said valve chest bores for controlling the inlet and discharge of pressure fluid into and from said valve chest bores.

10. A drilling machine comprising an elongated casing having a pair of cylinder bores, in one end of said casing, said cylinder bores being located in different planes which converge toward the other end of the casing and intersect in the transverse median plane of said casing, said casing end also having a valve chest bore parallel with and associated with each cylinder bore, said associated cylinder bores and valve chest bores having connecting passageways, there being passageways which connect the valve chest bores together, pistons and piston valves in said cylinder and valve chest bores respectively, a crank shaft journaled in the casing, said crank shaft having oppositely disposed crank pins and oppositely disposed eccentrics, the diameters of which are arranged at right angles to the diameter of said crank pins, means operatively connecting the piston with the crank pins, means operatively connecting the piston valves with the eccentrics, a spindle journaled in the other end of the casing, and operatively driven from the crank shaft, a valve plug located in the passageway connecting said valve chest bores, said valve plug having inlet and exhaust passageways which communicate with the passageways connecting said valve chest bores, and a valve sleeve associated with said valve plug for controlling the admission of an operating fluid into and out of said passageways in said valve plug.

11. In a pneumatically driven machine, a body, a driven member rotatively mounted in the body, a crank shaft operatively connected with said driven member to drive it in either direction, said crank shaft having its axis extending at right angles to said driven member, diametrically opposite crank pins on said crank shaft and diametrically opposite eccentrics on said crank shaft, the common diameter of said eccentrics being at right angles to the common diameter of said crank pins, and a double acting, two-cylinder motor unit, said cylinders being arranged with their central axes in planes intersecting at an acute angle, each cylinder having a parallel, associated valve chest bore, a piston in each cylinder bore, a piston valve in each valve chest bore, and connecting rods connecting each piston and each piston valve with the associated crank pin and associated eccentric.

In testimony that we claim the foregoing as our invention we affix our signatures in the presence of two witnesses, this 12th day of May, A. D. 1916.

MATHEW J. BURKEL.
PAUL B. WEIS.

Witnesses:
 LOUIS P. FOSNOT,
 T. H. ALFREDS.